United States Patent
Tanaka

(10) Patent No.: US 12,432,434 B2
(45) Date of Patent: Sep. 30, 2025

(54) SENSOR MODULE AND CASE UNIT

(71) Applicant: Sony Semiconductor Solutions Corporation, Kanagawa (JP)

(72) Inventor: Haruki Tanaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 298 days.

(21) Appl. No.: 17/914,150

(22) PCT Filed: Mar. 25, 2021

(86) PCT No.: PCT/JP2021/012579
§ 371 (c)(1),
(2) Date: Mar. 27, 2023

(87) PCT Pub. No.: WO2021/200557
PCT Pub. Date: Oct. 7, 2021

(65) Prior Publication Data
US 2023/0224565 A1    Jul. 13, 2023

(30) Foreign Application Priority Data
Mar. 31, 2020    (JP) ................. 2020-065013

(51) Int. Cl.
*H04N 23/55* (2023.01)
*G03B 17/12* (2021.01)
(Continued)

(52) U.S. Cl.
CPC ............. *H04N 23/55* (2023.01); *G03B 17/12* (2013.01); *H04N 23/52* (2023.01); *H04N 23/54* (2023.01); *G03B 17/08* (2013.01)

(58) Field of Classification Search
CPC ........ H04N 23/55; H04N 23/52; H04N 23/54; G03B 17/12; G03B 17/08; G03B 30/00;
(Continued)

(56) References Cited

U.S. PATENT DOCUMENTS

2014/0291527 A1* 10/2014 Okudo ................. G01J 5/0025
250/353
2017/0359524 A1* 12/2017 Hosono ............... H04N 5/2621
2019/0392226 A1   12/2019 Takahashi et al.

FOREIGN PATENT DOCUMENTS

CN      109474778 A    3/2019
JP      2009-078526 A  4/2009
(Continued)

OTHER PUBLICATIONS

CN 109474778A (Plastic Laser-front shell through welding of car camera), Wang et al. (Mar. 15, 2019) (Year: 2019).*
(Continued)

*Primary Examiner* — Yogesh K Aggarwal
(74) *Attorney, Agent, or Firm* — Wolf, Greenfield & Sacks, P.C.

(57) ABSTRACT

A sensor module according to an embodiment of the present technology includes a sensor element, a first case, a second case, and an intermediate layer. The first case includes an opening end and accommodates therein the sensor element. The second case includes a joining surface welded to the opening end. The intermediate layer is reflective of light, and is formed along an outer peripheral edge of a region, in the opening end, in which the opening end faces the joining surface.

10 Claims, 4 Drawing Sheets

(51) Int. Cl.
*H04N 23/52* (2023.01)
*H04N 23/54* (2023.01)
*G03B 17/08* (2021.01)

(58) Field of Classification Search
CPC . G03B 17/02; B29C 65/1641; B29C 65/1696; B29C 66/004; B29C 66/322; B29C 65/16; B29C 66/324; G02B 27/0006; G01D 11/245

See application file for complete search history.

(56) References Cited

FOREIGN PATENT DOCUMENTS

| JP | 2010-160404 A | 7/2010 |
|---|---|---|
| JP | 2012076418 A | 4/2012 |
| JP | 2018-173431 A | 11/2018 |
| JP | 2020-004366 A | 1/2020 |
| WO | 2017/212710 A1 | 12/2017 |

OTHER PUBLICATIONS

JP 2010160404 (Camera Module) Matsuoka, Jul. 22, 2010 (Year: 2010).*

International Written Opinion and English translation thereof mailed Jun. 15, 2021 in connection with International Application No. PCT/JP2021/012579.

International Preliminary Report on Patentability and English translation thereof mailed Oct. 13, 2022 in connection with International Application No. PCT/JP2021/012579.

Extended European Search Report issued Aug. 9, 2023 in connection with European Application No. 21780942.5.

International Search Report and English translation thereof mailed Jun. 15, 2021 in connection with International Application No. PCT/JP2021/012579.

* cited by examiner (A)

(B)

SENSOR MODULE AND CASE UNIT

CROSS-REFERENCE TO RELATED APPLICATIONS

This application claims the benefit under 35 U.S.C. § 371 as a U.S. National Stage Entry of International Application No. PCT/JP2021/012579, filed in the Japanese Patent Office as a Receiving Office on Mar. 25, 2021, which claims priority to Japanese Patent Application Number 2020-065013, filed in the Japanese Patent Office on Mar. 31, 2020, each of which is hereby incorporated by reference in its entirety.

TECHNICAL FIELD

The present technology relates to a sensor module and a case unit that are mounted on, for example, a vehicle.

BACKGROUND ART

For example, an electronic component or an optical component, such as a rear-view camera unit for automobile, that is placed outside of a vehicle (outdoors) may be accommodated in a waterproof and dustproof case. As disclosed in, for example, Patent Literature 1, such a case includes a board, a lens barrel that holds a lens, a front case, and a rear case that is used, together with the front case, to accommodate the lens barrel and the board. The front case and the rear case are joined to each other using welding by irradiation of laser light, and this results in improving a sealing performance of the case.

CITATION LIST

Patent Literature

Patent Literature 1: Japanese Patent Application Laid-open No. 2018-173431

DISCLOSURE OF INVENTION

Technical Problem

However, with respect to an imaging device disclosed in Patent Literature 1, melted portions generated by laser light on joining surfaces of the front case and the rear case may protrude toward the outside. Such a protrusion of melted portions toward the outside is also called a resin burr. Not only does the resin burr result in a poor appearance of an outer periphery of the case that forms an appearance surface of the product, but there is a need to additionally work on removing the protruding portion. Thus, it is desirable that the occurrence of poor appearance be suppressed and the removal of a protruding portion not be performed to facilitate an operation (to improve the productivity).

In view of the circumstances described above, it is an object of the present technology to provide a sensor module and a case unit that make it possible to suppress a protrusion of melted portions of resin molded products toward the outside when the resin molded products are joined using laser welding.

Solution to Problem

In order to achieve the object described above, a sensor module according to an embodiment of the present technology includes a sensor element, a first case made of a synthetic resin, a second case made of a synthetic resin, and an intermediate layer.

The first case includes an opening end and accommodates therein the sensor element.

The second case includes a joining surface welded to the opening end.

The intermediate layer is reflective of light, and is formed along an outer peripheral edge of a region, in the opening end, in which the opening end faces the joining surface.

In the sensor module, laser light, from among irradiated light, that is incident on the intermediate layer formed along the outer peripheral edge of the region in which the opening end faces the joining surface, is reflected off the intermediate layer. This prevents an outer peripheral region of a joining surface from being melted upon performing welding using the laser light. This makes it possible to prevent a melted portion from protruding from joining surfaces of the first case and the second case toward the outside.

The intermediate layer may have a width that is less than or equal to half a width of the region.

The intermediate layer may have a thickness of 50 µm or less.

The intermediate layer may be metal or a metallic compound.

The intermediate layer may be an optical multilayer.

The intermediate layer may be reflective of laser light of a specified wavelength, the first case may be made of a synthetic resin material that has absorptive properties with respect to the laser light, and the second case may be made of a synthetic resin material that has transmissive properties with respect to the laser light. The intermediate layer may be reflective of laser light of a specified wavelength, the second case may be made of a synthetic resin material that has absorptive properties with respect to the laser light, and the first case may be made of a synthetic resin material that has transmissive properties with respect to the laser light.

The sensor element may be an imaging device.

The sensor element may be a ranging sensor.

A case unit according to an embodiment of the present technology includes a first case, a second case, and an intermediate layer. The first case includes an opening end and accommodates therein the sensor element. The second case includes a joining surface welded to the opening end. The intermediate layer is reflective of light, and is formed along an outer peripheral edge or an inner peripheral edge of a region, in the opening end, in which the opening end faces the joining surface.

MODE(S) FOR CARRYING OUT THE INVENTION

Embodiments according to the present technology will now be described below with reference to the drawings.

[Configuration of Sensor Module]

Figure 1:
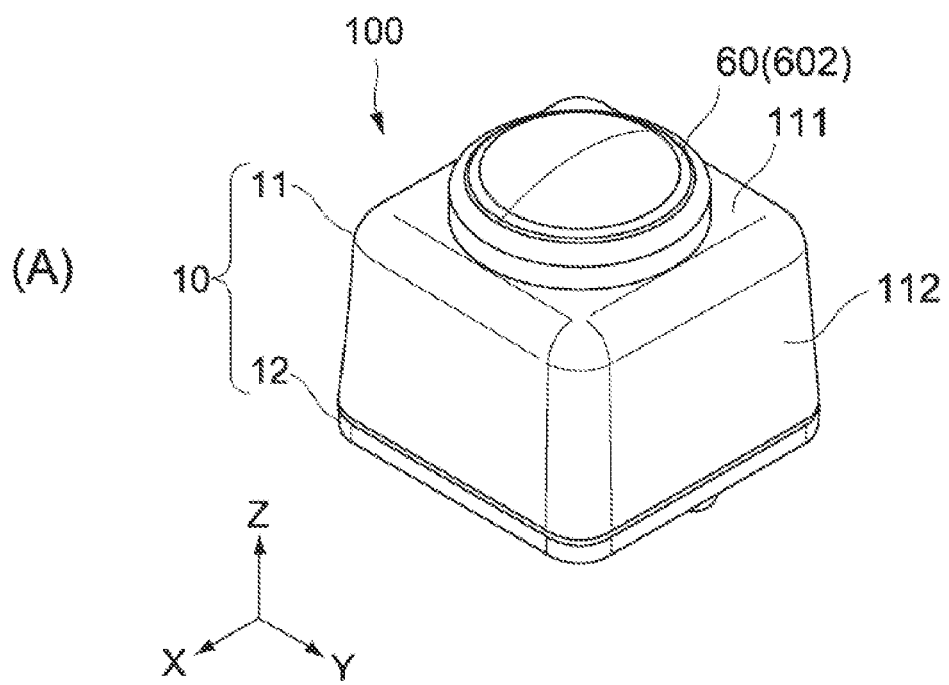
FIG. 1 is a set of overall perspective views of a sensor module according to an embodiment of the present technology.
Figure 1:
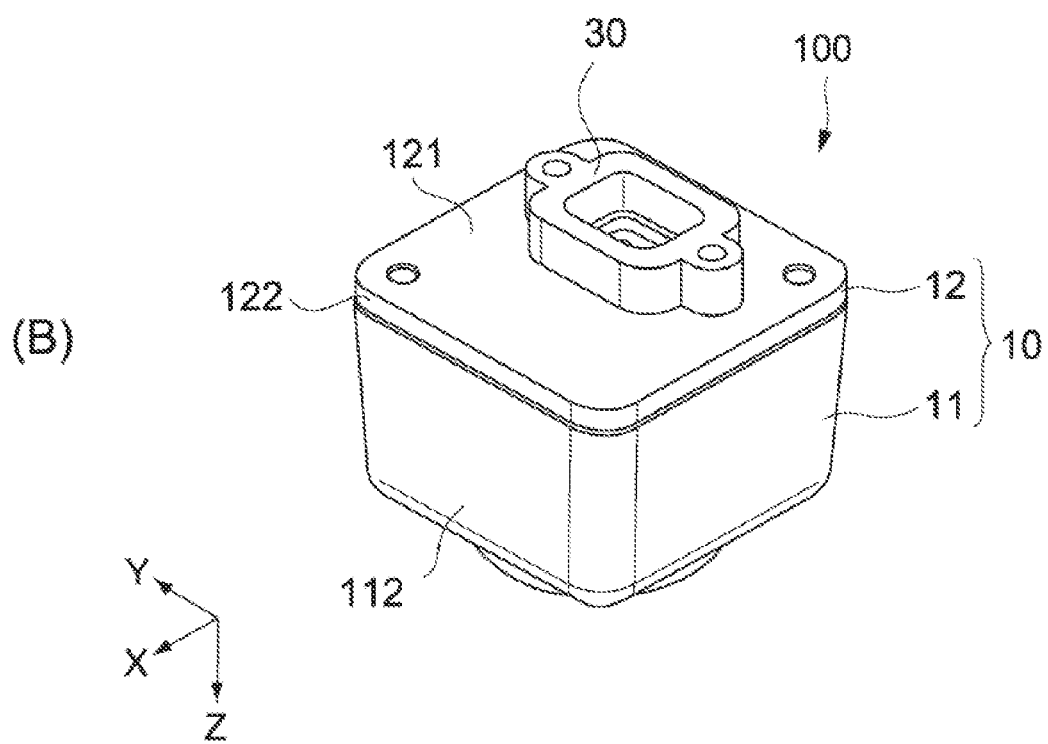
Figure 2:
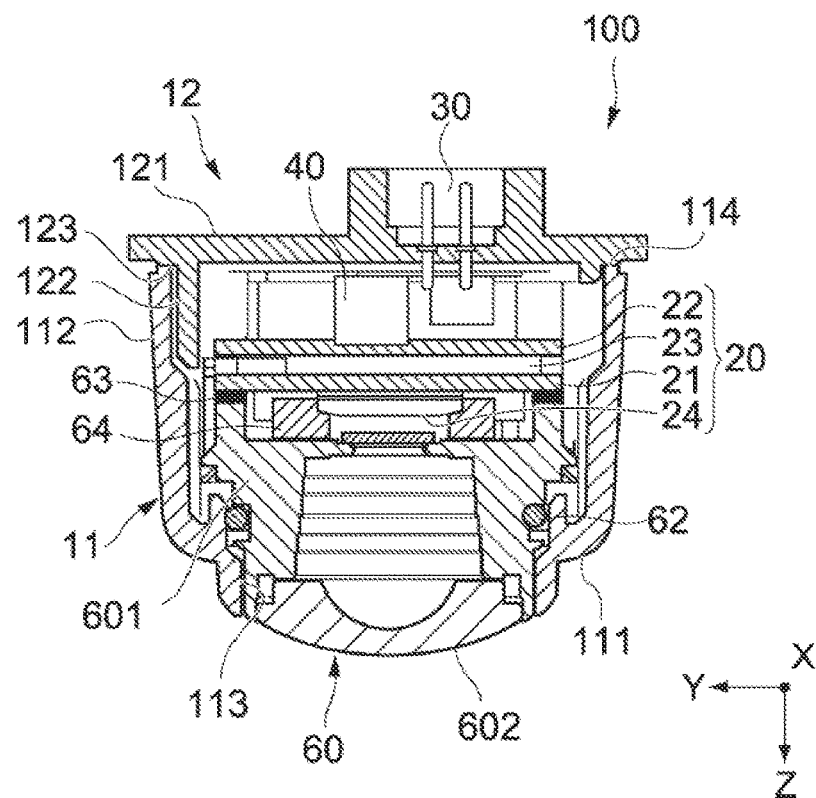
FIG. 2 is a cross-sectional side view of the sensor module.
Figure 3:
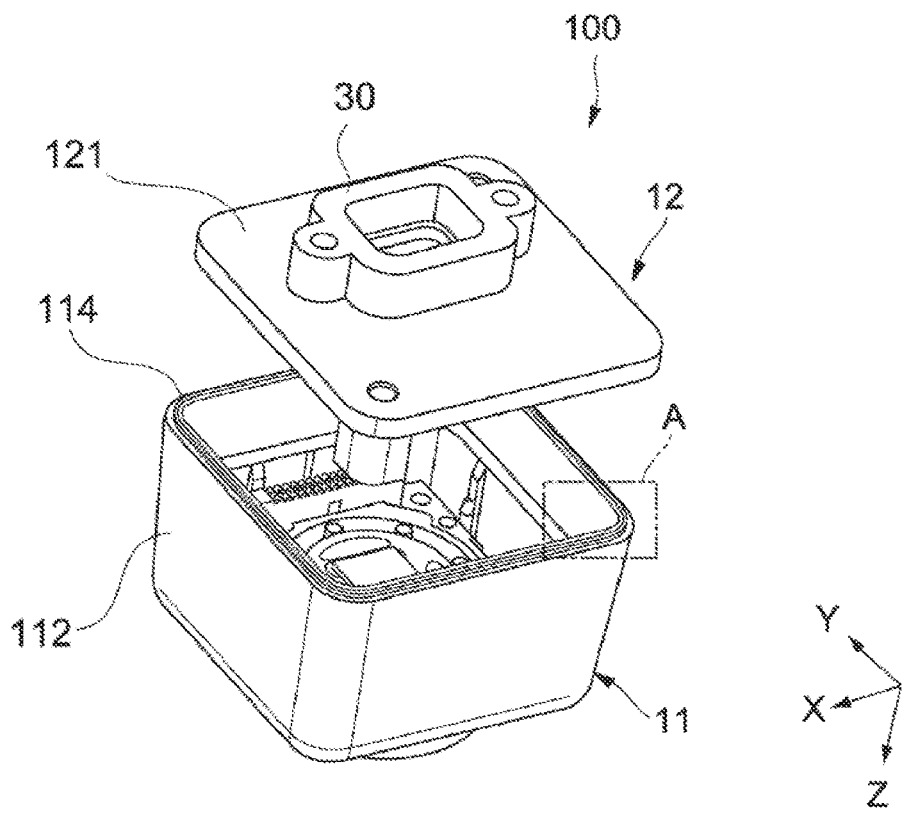
FIG. 3 is an exploded perspective view of a primary portion of the sensor module.

(A) and (B) of FIG. 1 are overall perspective views of a sensor module 100 according to an embodiment of the present technology. FIG. 2 is a longitudinal cross-sectional view of the sensor module 100. FIG. 3 is an exploded perspective view of a primary portion of the sensor module 100. An X axis, a Y axis, and a Z axis in each figure respectively represent directions of three axes that are orthogonal to each other, and the Z axis corresponds to an optical-axis direction of the sensor module 100.

The sensor module 100 of the present embodiment is a camera module used by being mounted on a vehicle. For example, the sensor module 100 is arranged outside of a vehicle body (an attachment target) (not illustrated), and captures an image of a region situated ahead of a vehicle, an image of a region situated behind the vehicle, or a region on a lateral side of the vehicle depending on an attachment position.

For example, the sensor module 100 attached to a front portion (for example, a radiator grill) of a vehicle body captures an image of an environment ahead of the vehicle. Further, the sensor module 100 attached to a rear portion (for example, above a license plate) of the vehicle body captures an image of an environment behind the vehicle. Furthermore, the sensor module 100 attached to a side portion of the vehicle (for example, an upper portion of a pillar (an A-pillar, a B-pillar, or a pillar (a C-pillar, a D-pillar) situated in a rearmost portion of the vehicle, or a sideview mirror) captures an image of an environment in a lateral direction of the vehicle.

As illustrated in FIGS. 1 and 2, the sensor module 100 includes, for example, a housing 10, a sensor board 20, and a barrel member 60.

The housing 10 is a case unit that is configured by a front case 11 that is a first case, and a rear case 12 that is a second case being combined in the optical-axis direction (the Z-axis direction). Typically, the front case 11 and the rear case 12 are injection-molded bodies made of a synthetic resin material.

The front case 11 includes a front surface portion 111 that is formed substantially orthogonal to the optical-axis direction (the Z-axis direction), and a lateral surface portion 112 that extends toward the rear case 122 from a peripheral edge of the front surface portion 111. In the present embodiment, the front surface portion 111 and the lateral surface portion 112 are substantially rectangular as viewed from the Z-axis direction. The front case 11 is hollow, and a space portion that accommodates therein, for example, the sensor board 20 and the barrel member 60 is formed in a region surrounded by the front surface portion 111 and the lateral surface portion 112.

The front surface portion 111 of the front case 11 includes an opening 113 in a middle portion of the front surface portion 111 (refer to FIG. 2). At an end of the lateral surface portion 112 that is situated on the side of the rear case 12, the front case 11 includes an opening end 114 that is welded to the rear case 12. The opening end 114 is formed to be substantially rectangular correspondingly to an outer shape of the front surface portion 111. Note that the front surface portion 111 and the opening end 114 are not limited to being rectangular, and may be formed into another shape, such as a circular shape or a triangular shape.

The rear case 12 is formed into a generally rectangular plate shape that includes a bottom surface portion 121 that is formed substantially orthogonal to a front-rear direction, and a lateral surface portion 122 that extends toward the front case 11 from a peripheral edge of the bottom surface portion 121. In a region surrounded by the bottom surface portion 121 and the lateral surface portion 122, a rectangularly annular joining surface 123 that is welded to the opening end 114 of the front case 11 is formed between the bottom surface portion 121 and an outer peripheral surface of the lateral surface portion 122. In the present embodiment, the front case 11 and the rear case 12 are integrated with each other by the joining surface 123 being joined to the opening end 114 using laser welding. This will be descried later.

The barrel member 60 is arranged in the front case 11. The barrel member 60 includes a barrel 601 that is fitted into the opening 113 through a seal ring 62 in the optical-axis Z direction. The barrel 601 is a cylindrical portion that supports an imaging lens 602, and protrudes forward of the front case 11 from the opening 113.

The sensor board 20 is arranged in the housing 10. The sensor board 20 includes a front board 21 that faces the front surface portion 111 of the front case 11, a rear board 22 that faces the bottom surface portion 121 of the rear case 12, and a spacer 23 that is arranged between the front board 21 and the rear board 22.

The front board 21 and the rear board 22 are rigid double-sided circuit boards such as glass epoxy boards, and a facing distance between the boards is defined by the spacer 23. The front board 21 and the rear board 22 are mechanically and electrically connected to each other through a board connector (a B-to-B connector) (not illustrated). The sensor board 20 is not limited to being formed of two boards that are the front board 21 and the rear board 22, and may be formed of a single board.

An imaging device 24 is mounted on the front board 21 as a sensor element. The imaging device 24 is an image sensor such as a complementary metal-oxide semiconductor (CMOS) image sensor or a charge coupled device (CCD) image sensor. The front board 21 is joined to the barrel member 601 through a joining member 63 and a cushion member 64, and the imaging device 24 is arranged on an optical axis of the imaging lens 602. Upon joining the front case 11 and the rear case 12, the cushion member 64 stably holds a facing distance between the barrel 61 and the imaging device 24 when the sensor board 20 is pressed toward the barrel 61 due to compression being performed between the sensor board 20 and the bottom surface portion 121 of the rear case 12.

Further, through a flexible printed circuit 40, the rear board 22 is electrically connected to a connector 30 that is provided to the bottom surface portion 121 of the rear case 12. The connector 30 is used to electrically connect the sensor board 20 and a vehicle body. Through the connector 30, power is supplied from the vehicle body to the sensor board 20, and an image signal (an output signal of the imaging device 24) is transmitted from the sensor board 20 to the vehicle body.

Note that, for example, a shield case that is used for electromagnetic noise shielding and surrounds the sensor board 20, a dustproof sheet, and a heat dissipating sheet are arranged in the housing 10, although this is not illustrated. One of ends of the shield case is fitted around the barrel member 60, and another of the ends of the shield case is brought into elastic contact with an inner surface of the bottom surface portion 121 of the rear case 12. Accordingly, the shield case serves as a biasing member that biases the barrel member 60 and the sensor board 20 jointed to the barrel member 60 toward the front case 11.

The front case 11 and the rear case 12 are joined to each other using laser welding. In the present embodiment, the front case 11 is made of a synthetic resin material that has absorptive properties with respect to laser light of a specified wavelength. Further, the rear case 12 is made of a synthetic resin material that has transmissive properties with respect to the laser light.

For example, a general-purpose resin such as an acrylonitrile-styrene (AS) resin or an acrylonitrile-butadiene-styrene (ABS) resin, a polycarbonate (PC) resin, a mixture resin of ABS and PC, a polyamide (PA) resin, or a polybutylene terephthalate (PBT) resin is used as a resin material that has absorptive properties or transmissive properties with respect to laser light.

The absorptive properties or the transmissive properties with respect to laser light can be adjusted by, for example, an amount of a laser-absorptive material that is mixed with a resin. For example, carbon black can be used as the laser-absorptive material. The adjustment of an amount of the laser-absorptive material added makes it possible to adjust the laser-light absorptance (or the laser-light transmittance) discretionarily. Note that it is favorable that the same type of matrix resin be used for a resin material having absorptive properties with respect to laser light and a resin material having transmissive properties with respect to the laser light. This results in increasing an affinity between resins situated at a joining portion and in enhancing the weld strength. Further, a change in a thickness of a resin makes it possible to adjust the transmittance. When the thickness of a resin is made larger (when a resin is made thicker), this makes it possible to further decrease the transmittance of the resin. Further, when the thickness of a resin is made smaller (when a resin is made thinner), this makes it possible to further increase the transmittance of the resin.

In the present embodiment, for example, red laser light or infrared laser light of a wavelength of from 800 nm to 1100 nm is used as laser light used for welding. With respect to a resin material having transmissive properties with respect to laser light, the transmittance of the resin material with respect to the laser light is greater than or equal to 30%, and favorably greater than or equal to 40%.

[Details of Joining Portion]

Figure 4:
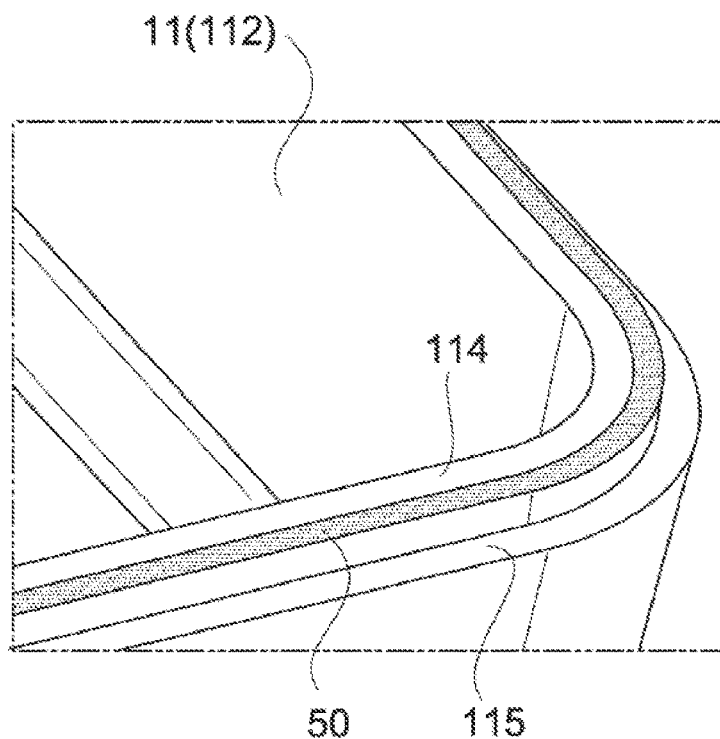
FIG. 4 is an enlarged view of a portion A in FIG. 3.
Figure 5:
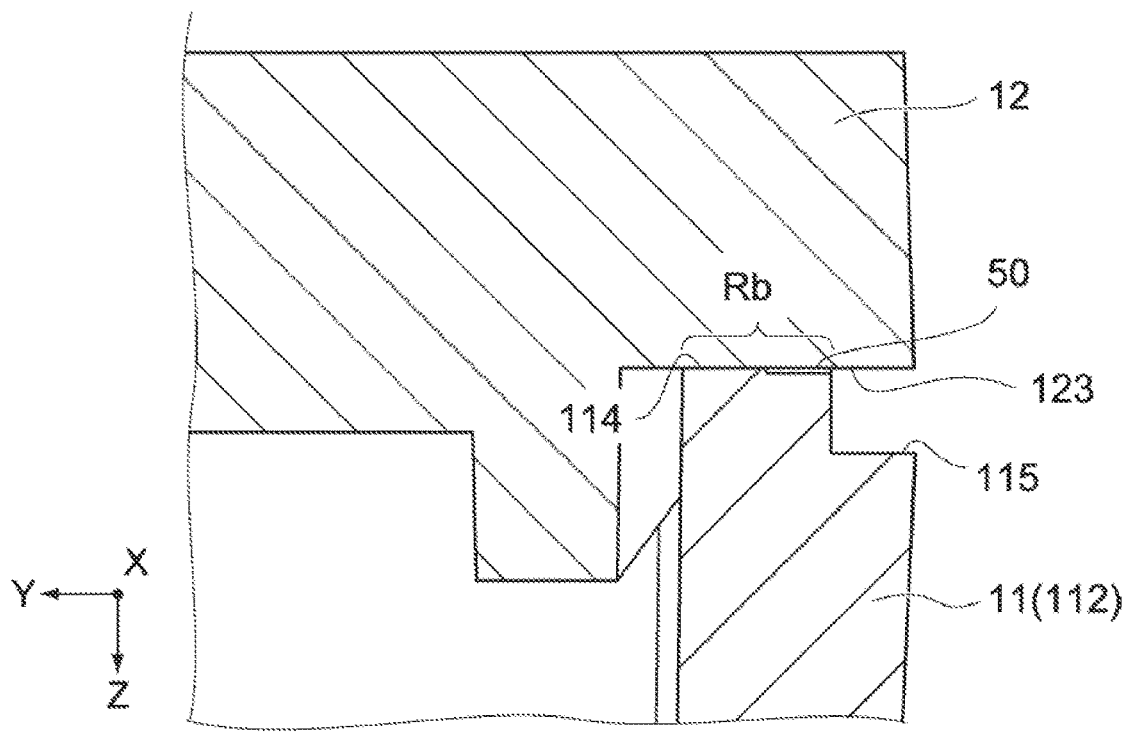
FIG. 5 is a cross-sectional view of a primary portion of the sensor module.
Figure 6:
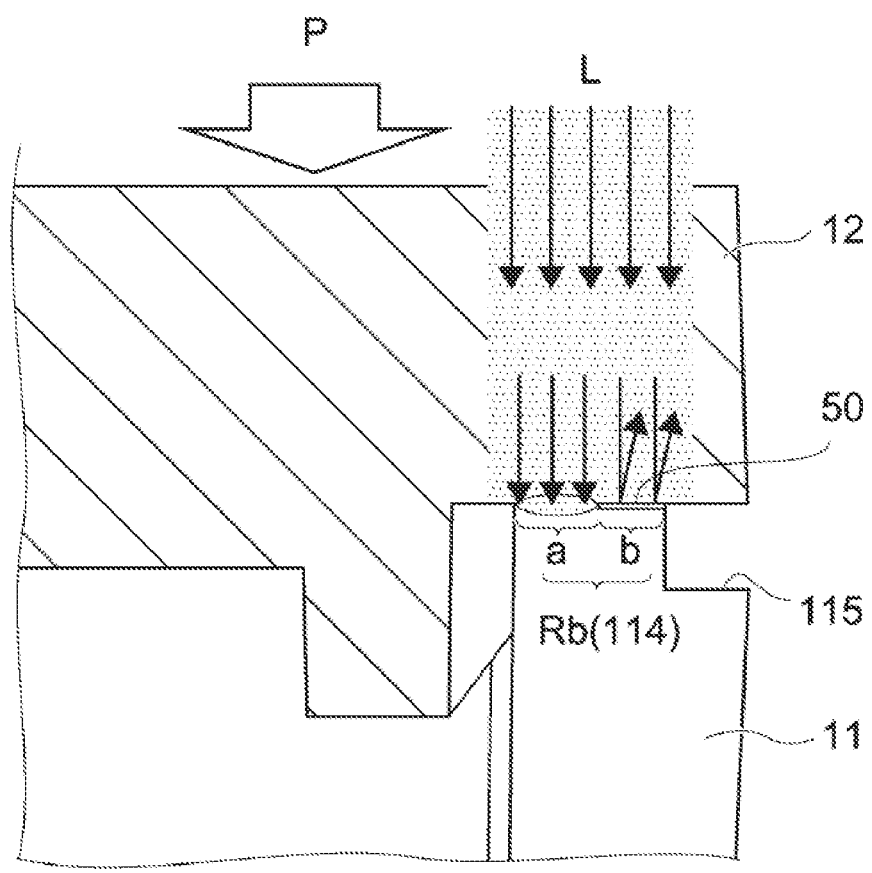
FIG. 6 is a cross-sectional view that is similar to the cross-sectional view of FIG. 5 and used to describe a process of welding a first case and a second case.

FIG. 4 is an enlarged view of a portion A that is a portion of the opening end 114 of the front case 11 in FIG. 3. FIG. 5 is a cross-sectional view of a joining portion of the opening end 114 and the joining surface 123 of the rear case 12. FIG. 6 is a cross-sectional view that is similar to the cross-sectional view of FIG. 5 and used to describe a process of welding the opening end 114 and the joining surface 123 by laser.

As illustrated in FIG. 4, an intermediate layer 50 is provided to the opening end 114 of the front case. As illustrated in FIG. 5, the intermediate layer 50 is formed along an outer peripheral edge of a region Rb, in the opening end 114, in which the opening end 114 faces the joining surface 123. The region Rb has a rectangularly annular shape, and the intermediate layer 50 is continuously formed along the outer peripheral edge of the region Rb.

In the present embodiment, a step portion 115 is provided between the lateral surface portion 112 of the front case 11 and an outer peripheral edge of the opening end 114, and the opening end 114 is provided to an end surface of a rectangularly annular protrusion that protrudes by a specified amount toward the rear case 12 on the side of an inner periphery of the step portion 115. Thus, the region Rb corresponds to the entirety of the opening end 114. Note that the step portion 115 does not particularly have to be provided, and can be omitted as necessary.

The intermediate layer 50 is made of a material reflective of laser light L that is irradiated from the side of the rear case 12 when the opening end 114 and the joining surface 123 are welded to each other by laser, as indicated by arrows in FIG. 6. The laser light L irradiated onto the region Rb, in the opening end 114, in which the opening end 114 faces the joining surface 123 is partially reflected off the intermediate layer 50, the laser light L being irradiated when the front case 11 and the rear case 12 are welded to each other by laser. Accordingly, heat generation caused due to the laser light L being absorbed by a region of the opening end 114 that is covered with the intermediate layer 50, is suppressed. This results in preventing the region of the opening end 114 that is covered with the intermediate layer 50 from being melted. This makes it possible to prevent a resin component making up the region from being melted and leaking out on the side of an outer periphery of the front case 11.

The intermediate layer 50 is a coating film that is formed in the outer peripheral edge of the opening end 114. A material of the intermediate layer 50 is not particularly limited as long as the material is reflective of the laser light L. For example, when the laser light L is light of a wavelength of around 1000 nm, the intermediate layer 50 having reflectance of 90% or more can be formed using a film of metal such as gold (Au), silver (Ag), or aluminum (Al).

The material of the intermediate layer 50 is not limited to the metal film described above, and may be a dielectric film. The intermediate layer 50 having reflectance of 99% or more with respect to laser light of a wavelength of 1074 nm can be formed using high-reflective (HR) coating "RMI" of FIT Leadintex, Inc. as this type of material.

Further, the material of the intermediate layer 50 is not limited to the metal film and the dielectric film described above, and, for example, a metallic compound such as $MgF_2$, or an optical multilayer (a dielectric multilayer) obtained by alternately arranging a high-refractive-index metal oxide and a constant-refractive-index metal oxide in a layered formation may be used.

A width of the intermediate layer 50 is not particularly limited as long as the width of the intermediate layer 50 is smaller than a width of the opening end 114 (a width of the region Rb, and the same applies to the following description). The width of the intermediate layer 50 can be set discretionarily according to a desired joining strength. Typically, the width of the intermediate layer 50 is less than or equal to half the width of the opening end 114, and is favorably less than or equal to one-third the width of the opening end 114. This makes it possible to effectively prevent a resin of the joining portion from being melted and leaking out on the side of the outer periphery, while securing a stable joining strength between the opening end 114 and the joining surface 123.

A thickness of the intermediate layer 50 is also not particularly limited. It is favorable that the intermediate layer 50 be formed to have a thickness that makes it possible to obtain a stable adhesion between the opening end 114 and the joining surface 123 upon laser welding. Thus, it is more favorable that the intermediate layer 50 have a smaller thickness, and, for example, a thickness of 50 μm or less. A method for forming the intermediate layer 50 is also not particularly limited, and the intermediate layer 50 can be formed using an appropriate method for forming a thin film, such as printing, application, or vapor deposition.

Further, a concave portion of a depth that corresponds to the thickness of the intermediate layer 50 may be formed in advance in a portion of the opening end 114 that corresponds to a region in which the intermediate layer 50 is to be formed. In this case, the surface of the intermediate layer 50 can be arranged in plane with the surface of the opening end 114 regardless of the thickness of the intermediate layer 50. In this case, a member such as a metal plate that is relatively thick can be used as the intermediate layer 50. A method such as bonding or insert molding may be adopted as a method for fixing the intermediate layer 50 to the opening end 114.

[Method for Producing Sensor Module]

When the sensor module 100 is produced, the barrel member 60, the sensor board 20, and the like are sequentially incorporated into the front case 11, and then the joining surface 123 of the rear case 12 is brought into contact with the opening end of the front case 11. Here, the sensor board 20 is electrically connected with the connector 30 through the flexible printed circuit 40.

Subsequently, laser light L is irradiated onto the rear case 12 toward the opening end 114 in a state in which the rear case 12 is pressed against the front case 11 with a specified pressure P, as illustrated in FIG. 6. The front case 11 is made of a resin material that has absorptive properties with respect to the laser light L, and the rear case 12 is made of a resin material that has transmissive properties with respect to the laser light L. Thus, the laser light L is transmitted through the rear case 12 to be irradiated onto the opening end 114 of the front case 11. The laser light L is rectangularly annularly scanned along the opening end 114. The laser light L may be a continuous wave or a pulsed wave.

A region, in the opening end 114, that is irradiated with the laser light L generates heat due to absorption of the laser light L to be partially melted. In the present embodiment, the intermediate layer 50 having the configuration described above is provided to the outer peripheral edge of the opening end 114. Thus, only an inner peripheral region (a region a in FIG. 6) of the opening end 114 that is not provided with the intermediate layer 50 is melted. On the other hand, an outer peripheral region (a region b in FIG. 6) of the opening end 114 that is provided with the intermediate layer 50 is shielded from the laser light L due to an effect of reflecting the laser light L that is provided by the intermediate layer 50. This results in preventing the outer peripheral region b from being melted.

The joining surface 123 facing the region a is also partially melted due to heat transfer from a melted portion (the region a) of the opening end 114. Thereafter, the melted portion of the region a and a melted portion of the joining surface 123 are cooled to be solidified, and the front case 11 and the rear case 12 are welded to each other. Since the laser light L is continuously scanned circumferentially along the rectangularly annular opening end 114, welding is performed on an all-around region of the opening end 114. This results in securing sealing properties of joining surfaces of the front case 11 and the rear case 12.

In the present embodiment, the intermediate layer 50 is provided to the outer peripheral edge of the opening end 114. This prevents a resin of the outer peripheral edge of the opening end 114 from being melted upon laser welding. This makes it possible to prevent a melted resin from protruding from the joining portion of the opening end 114 and the joining surface 123 toward an outer periphery of the housing 10. This results in being able to prevent the occurrence of a poor appearance of the outer periphery forming an appearance surface of the housing 10, and results in there being no need for an additional process of removing a protruding portion of the melted resin. Accordingly, an operation in the process of producing the sensor module 100 can be facilitated.

Further, according to the present embodiment, a melting amount of a melted portion in the opening end 114 or a melting amount of a resin can be adjusted by a location of or a formation width of the intermediate layer 50. This makes it possible to properly control an amount of a protruding resin upon welding, even if, for example, there is a variation in shapes or sizes of the front case 11 and the rear case 12, such as dimensional tolerances.

Furthermore, the present embodiment makes it possible to cause only the inner peripheral region a being included in the opening end 114 and not being covered with the intermediate layer 50 to be selectively melted even when laser light L is irradiated onto the entirety of the opening end 114. This results in there being no need to accurately adjust a location, in a component, onto which laser is irradiated. This makes it possible to prevent, as intended, a melted resin from protruding even if laser light L is irradiated onto the entirety of the opening end 114 in a width direction of the opening end 114, which is a conventional irradiation condition. Consequently, a desired welding quality can be secured without the effort to adjust a condition for equipment.

Moreover, the present embodiment makes it possible to prevent a resin of the joining portion from protruding toward the outer periphery, and thus to obtain a housing (case unit) structure that does not include a region, such as the step portion 115 (refer to FIGS. 4 to 6), that is used to accommodate a melted resin. This makes it possible to increase a degree of freedom in the design of the housing 10, and thus to apply the present technology to a small component for which securing a space for providing the region, such as the step portion 115, that is used to accommodate a resin, is difficult.

<Modifications>

In the embodiment described above, the intermediate layer 50 is provided to the opening end 114 of the front case 11. Without being limited thereto, the intermediate layer 50 may be provided to the joining surface of the rear case 12. In this case, effects similar to the effects provided by the embodiment described above can be obtained.

Further, the intermediate layer 50 is continuously formed along the outer peripheral edge of the region Rb (refer to FIG. 5). However, the intermediate layer 50 is not limited to being formed continuously, and there may be a missing portion.

Furthermore, the technology according to the present disclosure can be applied to various products. For example, the technology according to the present disclosure may be provided as a sensor module that is mounted on one of the types of mobile bodies such as vehicle, electric vehicle, hybrid electric vehicle, motorcycle, bicycle, personal mobility, airplane, drone, ship, robot, construction machinery, and agricultural machinery (tractor).

Further, a camera module has been described as an example of the sensor module 100 in the embodiment described above. However, the present technology is not limited thereto. For example, the present technology can also be adopted for a sensor module that includes, as a sensor element, a ranging sensor such as light detection and ranging (LiDAR) or a time-of-flight (ToF) sensor.

Further, in the present embodiment, the intermediate layer 50 is provided along the outer peripheral edge of the region Rb, in the opening end 114, in which the opening end 114 of the front case 11 faces the joining surface 123 of the rear case 12, but the configuration is not limited thereto. For example, in the case of a product in which there is a need to prevent a melted resin from protruding toward the inside of the housing, the intermediate layer 50 may be provided along an inner peripheral edge of the region Rb. Specifically, such a configuration is suitable for products such as a product of which a housing has a small internal volume and a product for which there is a need to protect a component accommodated in a housing from being brought into contact with a protruding portion of a melted resin of a joining portion.

Note that the present technology may also take the following configurations.

(1) A sensor module, including:
a sensor element;
a first case that includes an opening end and accommodates therein the sensor element;
a second case that includes a joining surface welded to the opening end; and
a light-reflective intermediate layer that is formed along an outer peripheral edge of a region, in the opening end, in which the opening end faces the joining surface.

(2) The sensor module according to (1), in which the intermediate layer has a width that is less than or equal to half a width of the region.

(3) The sensor module according to (1) or (2), in which the intermediate layer has a thickness of 50 μm or less.

(4) The sensor module according to any one of (1) to (3), in which
the intermediate layer is metal or a metallic compound.

(5) The sensor module according to any one of (1) to (3), in which
the intermediate layer is an optical multilayer.

(6) The sensor module according to any one of (1) to (5), in which
the intermediate layer is reflective of laser light of a specified wavelength,
the first case is made of a synthetic resin material that has absorptive properties with respect to the laser light, and
the second case is made of a synthetic resin material that has transmissive properties with respect to the laser light.

(7) The sensor module according to any one of (1) to (6), in which
the intermediate layer is a coating film that is formed in an outer peripheral edge of the opening end.

(8) The sensor module according to any one of (1) to (7), in which
the sensor element is an imaging device.

(9) The sensor module according to any one of (1) to (7), in which
the sensor element is a ranging sensor.

(10) A case unit, including:
a first case that includes an opening end;
a second case that includes an annular joining surface welded to the opening end; and
a light-reflective intermediate layer that is formed along an outer peripheral edge or an inner peripheral edge of a region, in the opening end, in which the opening end faces the joining surface.

REFERENCE SIGNS LIST 11 front case (first case)
12 rear case (second case)
24 imaging device
50 intermediate layer
100 sensor module
114 opening end
123 joining surface
L laser light

The invention claimed is:

1. A sensor module, comprising:
a sensor element;
a first case that includes a planar peripheral region surrounding an opening at an opening end and accommodates therein the sensor element;
a second case that includes a joining surface welded to the opening end, wherein the joining surface is substantially parallel to the region of the first case; and
a light-reflective intermediate layer that is formed along an outer peripheral edge of the region at the opening end of the first case and that is also substantially parallel to the joining surface of the second case,
wherein, during welding, the light-reflective intermediate layer that is formed along the outer peripheral edge of the region at the opening end of the first case prevents a melted portion from protruding from joining surfaces of the first case and second case toward the outside.

2. The sensor module according to claim 1, wherein the intermediate layer has a width that is less than or equal to half a width of the region.

3. The sensor module according to claim 1, wherein the intermediate layer has a thickness of 50 μm or less.

4. The sensor module according to claim 1, wherein the intermediate layer is metal or a metallic compound.

5. The sensor module according to claim 1, wherein the intermediate layer is an optical multilayer.

6. The sensor module according to claim 1, wherein the intermediate layer is reflective of laser light of a specified wavelength,
the first case is made of a synthetic resin material that has absorptive properties with respect to the laser light, and
the second case is made of a synthetic resin material that has transmissive properties with respect to the laser light.

7. The sensor module according to claim 1, wherein the intermediate layer is a coating film that is formed in an outer peripheral edge of the opening end.

8. The sensor module according to claim 1, wherein the sensor element is an imaging device.

9. The sensor module according to claim 1, wherein the sensor element is a ranging sensor.

10. A case unit, comprising:
a first case that includes a planar peripheral region surrounding an opening at an opening end;
a second case that includes an annular joining surface substantially parallel to the region of the first case and welded to the opening end; and
a light-reflective intermediate layer that is formed along an outer peripheral edge or an inner peripheral edge of the region at the opening end of the first case and that is also substantially parallel to the joining surface of the second case,
wherein, during welding, the light-reflective intermediate layer that is formed along the outer peripheral edge of the region at the opening end of the first case prevents a melted portion from protruding from joining surfaces of the first case and second case toward the outside.

* * * * *